US008219614B2

United States Patent
Oh et al.

(10) Patent No.: US 8,219,614 B2
(45) Date of Patent: Jul. 10, 2012

(54) EDGE PEER DEVICE, PAN GATEWAY DEVICE, SUPER PEER DEVICE, AND P2P NETWORK-BASED INTERCONNECTION METHOD

(75) Inventors: Byeong Thaek Oh, Daejeon (KR); Sang Bong Lee, Daejeon (KR); Il Woo Lee, Daejeon (KR); Moonok Choi, Daejeon (KR); Shin Yuk Kang, Daejeon (KR); Ho Jin Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 438 days.

(21) Appl. No.: 12/505,611

(22) Filed: Jul. 20, 2009

(65) Prior Publication Data
US 2010/0138552 A1    Jun. 3, 2010

(51) Int. Cl.
*G06F 15/16* (2006.01)
(52) U.S. Cl. ......... 709/204; 709/212; 709/213; 709/216
(58) Field of Classification Search .................. 709/204, 709/212, 213, 216
See application file for complete search history.

(56) References Cited

U.S. PATENT DOCUMENTS

| 7,991,764 B2 * | 8/2011 | Rathod ......................... 707/713 |
| 2005/0147071 A1 * | 7/2005 | Karaoguz et al. ............. 370/338 |
| 2009/0063691 A1 * | 3/2009 | Kalofonos et al. ............ 709/229 |
| 2009/0168701 A1 * | 7/2009 | White et al. .................. 370/328 |

FOREIGN PATENT DOCUMENTS

| KR | 1020030023930 A | 3/2003 |
| KR | 1020060075532 A | 7/2006 |

* cited by examiner

*Primary Examiner* — Djenane Bayard
(74) *Attorney, Agent, or Firm* — Ladas & Parry LLP

(57) ABSTRACT

An edge peer device, includes a first peer device connection management unit for allowing the edge peer device to participate in a peer-to-peer (P2P) network, and establishing a pipe connection to other edge peer device or the PAN gateway device to transmit or receive contents; a first peer device authentication unit for performing authentication of the edge peer device and PAN gateway device; and a first advertisement management unit for generating and storing advertisements and indexing the generated advertisements to transmit the indexed advertisements to the super peer device. Further, the edge peer device includes a first PAN device management unit for requesting and receiving a list of PAN devices from the PAN gateway device to manage the PAN device list; a first PAN service management unit for managing and providing services included in the PAN device list; and a first P2P communication unit for performing P2P communication with the super peer device and other peer devices.

18 Claims, 8 Drawing Sheets

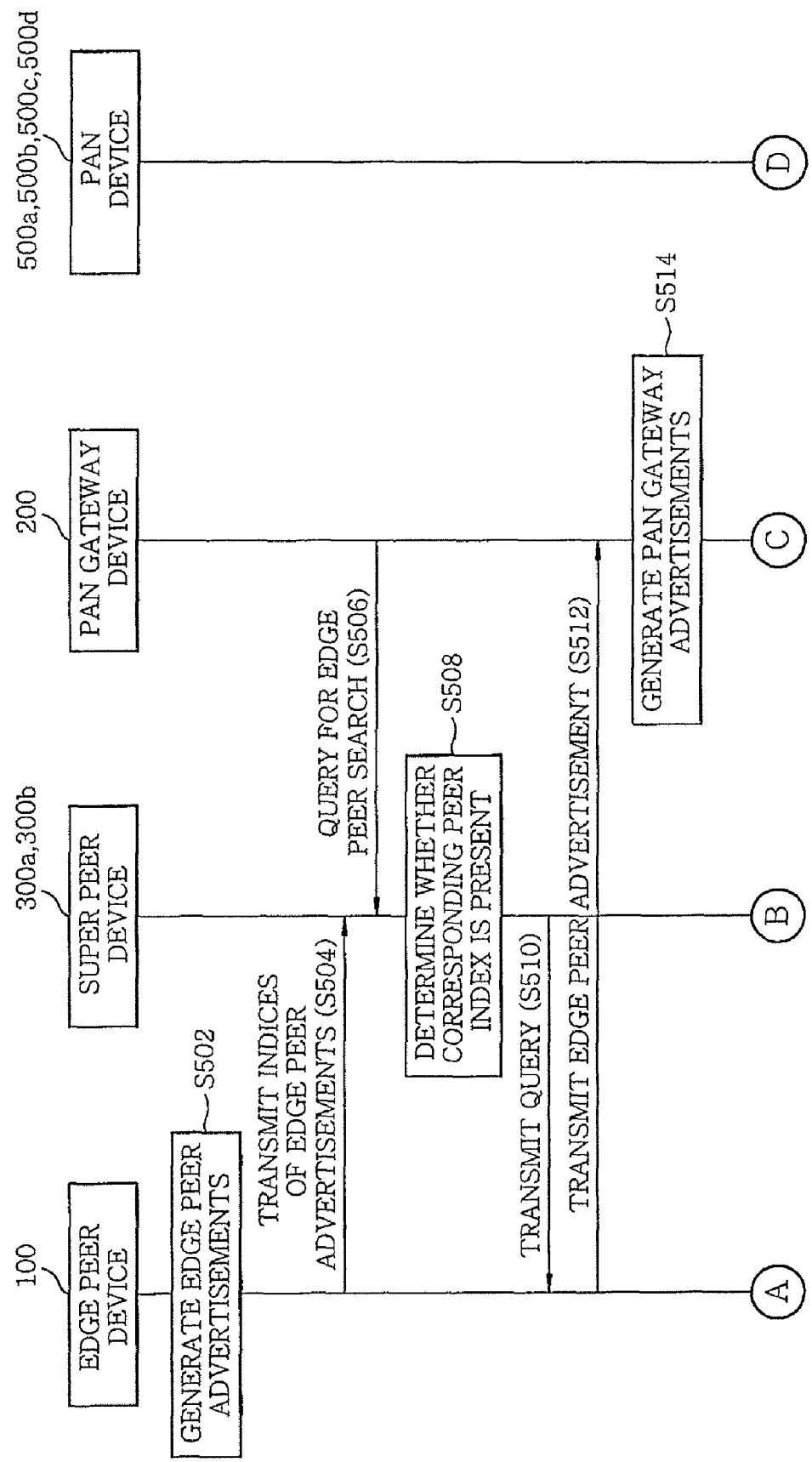

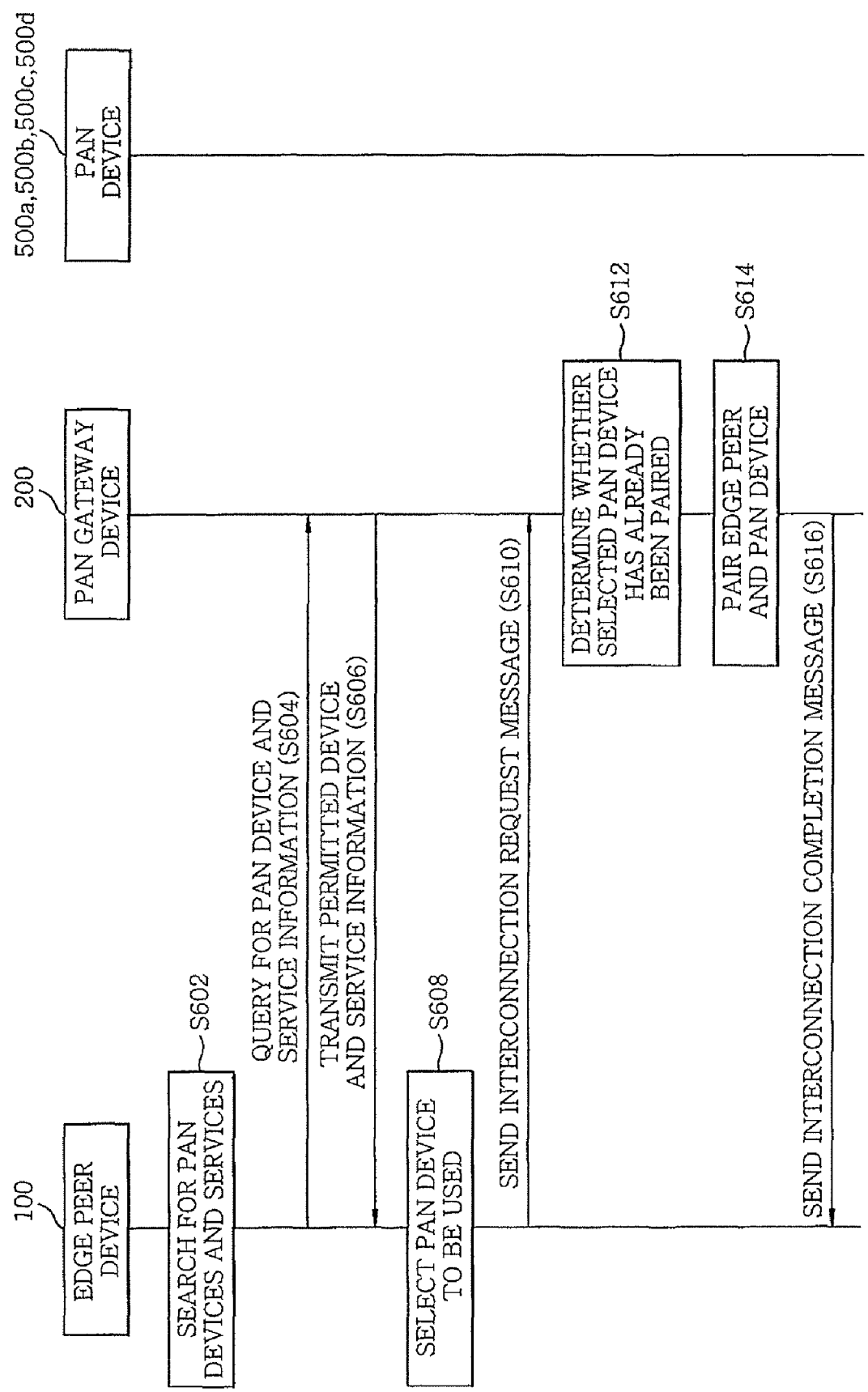

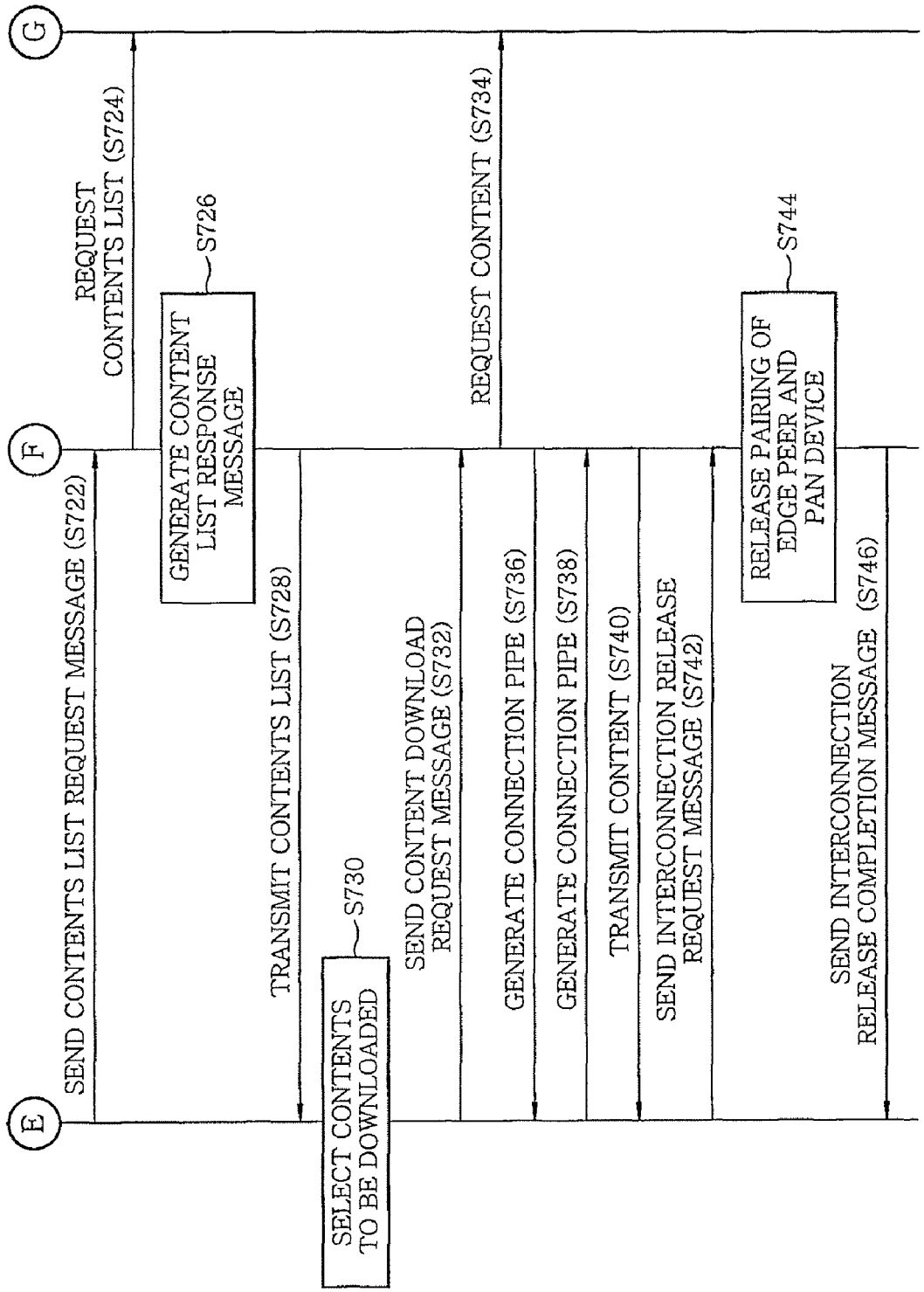

EDGE PEER DEVICE, PAN GATEWAY DEVICE, SUPER PEER DEVICE, AND P2P NETWORK-BASED INTERCONNECTION METHOD

CROSS-REFERENCE TO RELATED APPLICATIONS

The present invention claims priority of Korean Patent Application No. 10-2008-0120794, filed on Dec. 1, 2008, and Korean Patent Application No. 10-2009-0035606, filed on Apr. 23, 2009, which are incorporated herein by references.

FIELD OF THE INVENTION

The present invention relates, in general, to a method for interconnection between a Peer-To-Peer (P2P) network and a Personal Area Network (hereinafter referred to as a 'PAN'), and, more particularly, to an edge peer device, a PAN gateway device, a super peer device, and a P2P network-based interconnection method, which are suitable for interconnection between a super peer-based P2P network and a PAN to realize a content sharing structure having more excellent scalability and higher stability.

BACKGROUND OF THE INVENTION

As is well known to those skilled in the art, with the development of the communication environment and the realization of high-performance personal terminals, user demands for content sharing and service interconnection between various devices anytime and anywhere have increased. Technology for searching for and sharing services and contents between respective devices by configuring virtual space which provides seamless connection between personal terminals is required.

Generally, P2P technology is used to share content, and is provided as technology for efficiently utilizing a distributed network environment depending on the computation and bandwidth performance of machines participating in the configuration of a network, rather than concentrating a content sharing function on a small number of servers. This technology enables a peer device participating in a communication network to communicate with other peer device and to share resources for example, storage, content, computing resources, and the like with the other peer device without using a server. In this case, since the peer device can function as both a server and a client, it can directly share its resources with another peer device.

Techniques for configuring such a P2P network are classified into pure P2P, hybrid P2P, super peer-based P2P, and the like. However, pure P2P in which the concept of P2P is implemented without change is disadvantageous in that important functions such as the provision of search information are not concentrated, so that the performance of resource search or the like is deteriorated, and thus the pure P2P does not greatly attract popularity due to performance limitations. Further, hybrid P2P is problematic in that, since important functions such as those of a central server are excessively concentrated on one place to search for peers on a P2P network or data provided by the peers, the hybrid P2P is vulnerable to failure.

Therefore, several peer device having excellent computer performance or excellent network environments are selected from among various nodes and are set as super peer device, and the super peer device are configured to perform the functions of the central server of hybrid P2P in a distributed manner. Such a super peer-based P2P network is characterized in that, when defects occur in one super peer device, another super peer device can perform the function of the defective super peer device. Accordingly, neither the case where a network cannot perform its function as in the case of the hybrid P2P when an important peer device is powered down, nor the case where performance is deteriorated because a server for assisting in searching is not present as in the case of the pure P2P, occurs.

Further, among the communication techniques of equipment used by individuals, PAN communication methods such as Bluetooth, Zigbee, and Ultra-Wideband (UWB) have recently been popularized and have formed the general trend, and markets related thereto have very rapidly increased in size. In particular, users occasionally synchronize data between their computers and personal small-sized digital equipment with each other in a wireless manner by using PAN technology, occasionally use a wireless Bluetooth mouse or perform wireless printing by using PAN technology, and furthermore occasionally interconnect electric home appliances in the home by using PAN communication technology.

In compliance with such user demands, in order for each user to share Bluetooth devices and related services with other users, the development of technology for interconnection between an existing IP-based network and a non-IP-based Bluetooth network is currently required.

SUMMARY OF THE INVENTION

In view of the above, the present invention provides an edge peer device, a PAN gateway device, a super peer device, and a P2P network-based interconnection system and method, which can improve the scalability and stability of a content sharing service through the interconnection between an IP-based P2P network and a non-IP-based Bluetooth network.

In accordance with a first aspect of the present invention, there is provided an edge peer device, including: a first peer device connection management unit for allowing the edge peer device to participate in a Peer-to-Peer (P2P) network through a connection to a super peer device or a Personal Area Network (PAN) gateway device, and establishing a pipe connection to other edge peer device or the PAN gateway device to transmit or receive contents; a first peer device authentication unit for performing authentication of the edge peer device through the super peer device and an authentication server; a first advertisement management unit for generating and storing advertisements which notifies the P2P network of edge peer information and indexing the generated advertisements to transmit the indexed advertisements to the super peer device; a first PAN device management unit for requesting and receiving a list of PAN devices from the PAN gateway device to manage the PAN device list after the PAN gateway device has been found; a first PAN service management unit for managing and providing services included in the PAN device list; and a first P2P communication unit for performing P2P communication with the super peer device and other peer devices.

In accordance with a second aspect of the present invention, there is provided a Personal Area Network (PAN) gateway device, including: a second peer device connection management unit for allowing the PAN gateway device to participate in a P2P network through a connection to a super peer device or an edge peer device, and establishing a pipe connection to the edge peer device or other PAN gateway device to transmit or receive contents; a second peer device authentication unit for performing authentication of the PAN gateway device through both the super peer device and an authentication server; a second advertisement management unit for generating and storing advertisements which notify the P2P network of PAN gateway information and indexing the advertisements to transmit the indexed advertisements to the super peer device; a PAN profile and library management unit for searching for surrounding PAN devices and pairing the edge peer device and the found PAN devices; a second PAN device management unit for managing a list of the found PAN devices to generate Universal Unique Identifiers (UUIDs) corresponding to the PAN devices; a second PAN service management unit for managing services of the found PAN devices to generate and manage UUIDs corresponding to the respective services; a device and network monitoring unit for managing status and history of connection to the PAN devices to manage and monitor strength of communication with the PAN devices; and a second P2P communication unit for performing P2P communication with the super peer device and other peer devices.

In accordance with a third aspect of the present invention, there is provided a super peer device, comprising: a third peer device connection management unit for requesting authentication from an authentication server when a request for participation in a Peer-to-Peer (P2P) network is received from a Personal Area Network (PAN) gateway device or an edge peer device to transmit results of authentication to the PAN gateway device or the edge peer device; an advertisement index management unit for storing indices of advertisements received from the PAN gateway device or the edge peer device to propagate the indices to other super peer device; a message propagation and relay unit for propagating a message received from the PAN gateway device or the edge peer device to other peer or other gateway to search for a specific peer device or resource information when a query for a search for the specific peer device or content is received from the PAN gateway device or the edge peer device; and a third P2P communication unit for performing P2P communication with the PAN gateway device, the edge peer device and other super peer device.

In accordance with a fourth aspect of the present invention, there is provided a Peer-to-Peer (P2P) network-based interconnection method, including: authenticating both an edge peer device and a Personal Area Network (PAN) gateway device to allow the edge peer device and the PAN gateway device to participate in a P2P network; receiving advertisement indices corresponding to edge peer advertisements or PAN gateway advertisements generated by the edge peer device or the PAN gateway device, respectively manage the advertisement indices; determining whether an advertisement index corresponding to a search target edge peer device or a search target PAN gateway device is present, when a search query is received from the PAN gateway device or the edge peer device; transferring the search query to the search target edge peer device or the search target PAN gateway device through a super peer device, if it is determined that the advertisement index is present; and transmitting an edge peer advertisement or a PAN gateway advertisement to the PAN gateway device or the edge peer device, which requested the search, in response to the received search query.

In accordance with a fifth aspect of the present invention, there is provided a Peer-to-Peer (P2P) network-based interconnection method, including: receiving a query, which requests provision of information of surrounding PAN devices and services, from an edge peer device in a personal area network (PAN) gateway device; transmitting information of surrounding PAN devices, permitted to be used by the edge peer device, to the edge peer device; receiving an interconnection request message for requesting interconnection with a specific PAN device selected to be used from among the surrounding PAN devices; determining whether the selected specific PAN device has already been interconnected with other peer device in response to the received interconnection request message; and pairing and interconnecting the edge peer device and the specific PAN device according to a profile of the PAN device, if it is determined that the selected specific PAN device has not already been interconnected with other peer device.

The present invention is configured to implement a P2P network-based interconnection system including an edge peer device, a PAN gateway device, a super peer device, an authentication server, and Bluetooth devices. The edge peer device transmits edge peer advertisements to participate in a P2P network, generates and sends a search request message for surrounding Bluetooth devices or content, and receives content transmitted from a Bluetooth device interconnected therewith in response to the search request message. The PAN gateway device transmits PAN gateway advertisements to participate in a P2P network, manages a list of surrounding Bluetooth devices, and manages services corresponding to the Bluetooth devices. The super peer device indexes and manages the received edge peer advertisements and PAN gateway advertisements, propagates messages, and disperses the indexed edge peer advertisements and PAN gateway advertisements. The authentication server authenticates the edge peer device or the PAN gateway device through the super peer device. Each of the Bluetooth devices provides information about a device list and services and content to the PAN gateway device. By means of these technical means, the problems of the conventional technology can be solved.

In the present invention, it is possible to interconnect an IP-based P2P network and a non-IP-based Bluetooth network, thus improving the scalability of an overlay network for virtual space, and the problem of a single point failure occurring in the sharing of content can be prevented by using super peer-based P2P networking technology without using a server in order to search for a device and content on the network, thus providing a more stable and efficient search service.

BRIEF DESCRIPTION OF THE DRAWINGS

The objects and features of the present invention will become apparent from the following description of embodiments given in conjunction with the accompanying drawings, in which:

FIGS. 5A and 5B are flowcharts showing a process for selecting a PAN device and setting authority to use the selected PAN device in accordance with the embodiment of the present invention;

FIG. 6 is a flowchart showing a process for interconnection between an edge peer device and a PAN device in accordance with the embodiment of the present invention; and FIGS. 7A and 7B are flowcharts showing a process for controlling a PAN device and exchanging contents through the interconnection between an edge peer device and the PAN device in accordance with the embodiment of the present invention.

DETAILED DESCRIPTION OF THE EMBODIMENTS

Hereinafter, embodiments of the present invention will be described in detail with reference to the accompanying drawings which form a part hereof.

Figure 1:
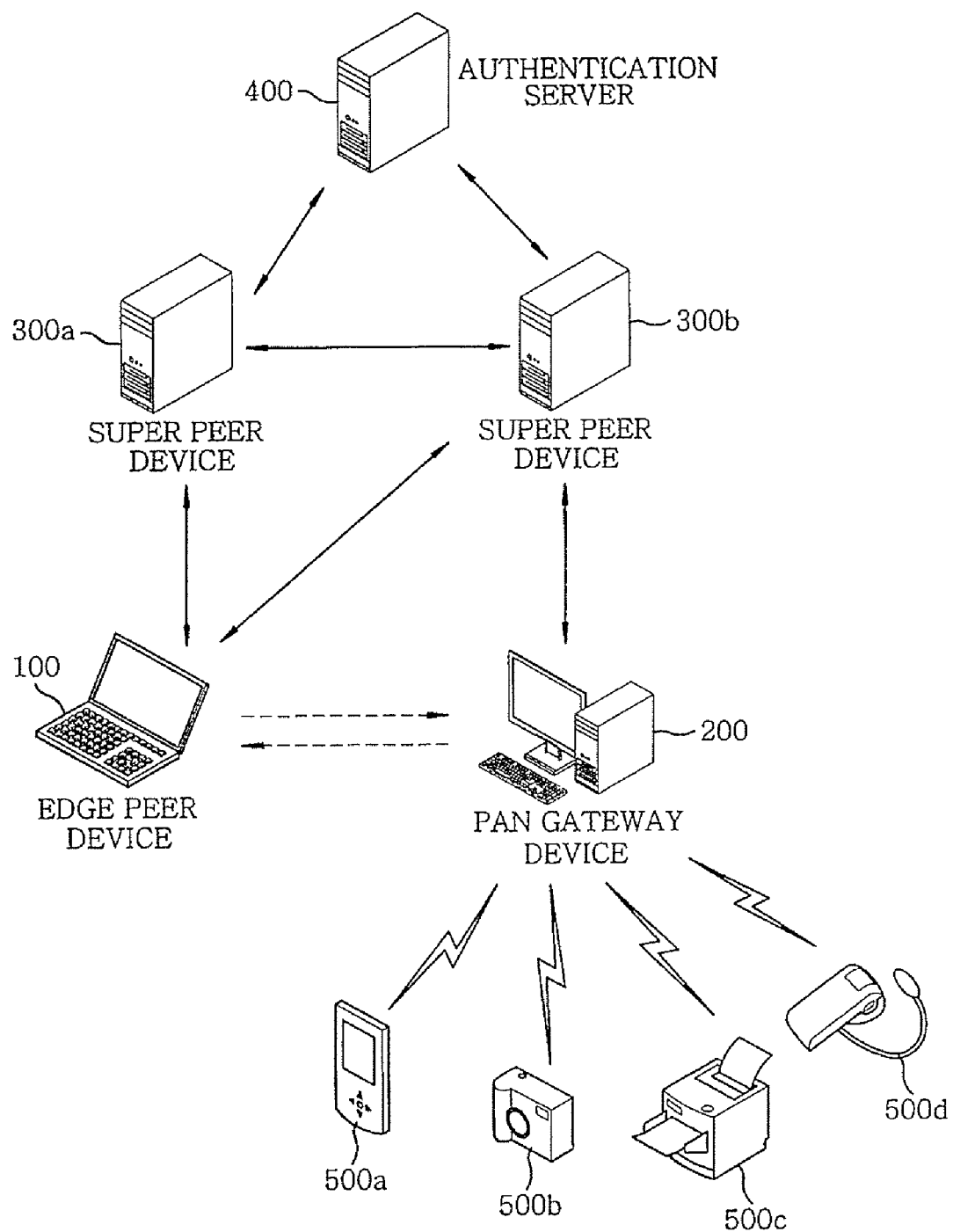
FIG. 1 is a configuration view of a P2P network-based interconnection system suitable for the performance of interconnection between a super peer-based P2P network system and PAN devices in accordance with an embodiment of the present invention.

FIG. 1 is a configuration view of a P2P network-based interconnection system suitable for the performance of interconnection between a super peer-based P2P network system and PAN devices in accordance with an embodiment of the present invention. The interconnection system includes an edge peer device 100, a PAN gateway device 200, super peer devices 300a and 300b, an authentication server 400, and PAN devices 500a, 500b, 500c and 500d. Here, the edge peer device 100, the PAN gateway device 200 and the super peer devices 300a and 300b may be included in a super peer-based P2P network system. A P2P network environment may be composed of peer devices and super peer devices, and the peer devices may be connected to each other through one super peer device. However, hereinafter, a description will be made on the assumption that a network environment is a P2P network environment in which two peer devices (an edge peer device and a PAN gateway device) are connected to different super peer devices, respectively, and that PAN devices are PAN devices using a PAN communication method such as Bluetooth, Zigbee or UWB.

As shown in FIG. 1, each of the edge peer device 100 and the PAN gateway device 200 transmits advertisements, notifying the P2P network of information about its ID and resources for example, possessed content, services to be provided, and the like and generates and sends a search request message required for searching to other peer device or other PAN gateway device. In this case, the term "peer" may include a terminal device in which an operating system (OS) is embedded, for example, a desktop personal computer (PC), a notebook PC, a personal digital assistant (PDA), and the like. In the present invention, each of the edge peer device 100 and the PAN gateway device 200 corresponds to such a peer device.

Further, the super peer devices 300a and 300b function to perform indexing, required to propagate or search for the received search request message, and to distribute indices among super peer devices. In the super peer-based P2P network, super peer devices may index and manage the resource advertisements of edge peer devices and propagate messages to search for edge peer devices and the resources thereof. In order to perform efficient and stable search together with the performance of message propagation, the super peer devices may distribute indexing information indexed by the edge peer device or the super peer devices themselves. The advertisements described here refer to advertisements for resources on the P2P network.

The edge peer device 100 and the PAN gateway device 200 register user information, including user IDs and passwords respectively input from users, in the authentication server 400.

Further, the super peer devices 300a and 300b and the authentication server 400 are devices for providing a P2P network service, and security communication may be implemented between the super peer devices 300a and 300b and the authentication server 400.

Meanwhile, the PAN devices 500a, 500b, 500c and 500d may include all PAN devices enabling PAN communication such as Bluetooth, Zigbee or UWB, for example, personal terminals such as PDAs, digital cameras, printers, headsets and the like, which support communication such as Bluetooth, Zigbee or UWB.

Hereinafter, the edge peer device which transmits advertisements, notifying a P2P network of its ID and resource information, or generates and sends the search request message for searching to other peer device or other PAN gateway device in the above-described interconnection system will be described in detail.

Figure 2:
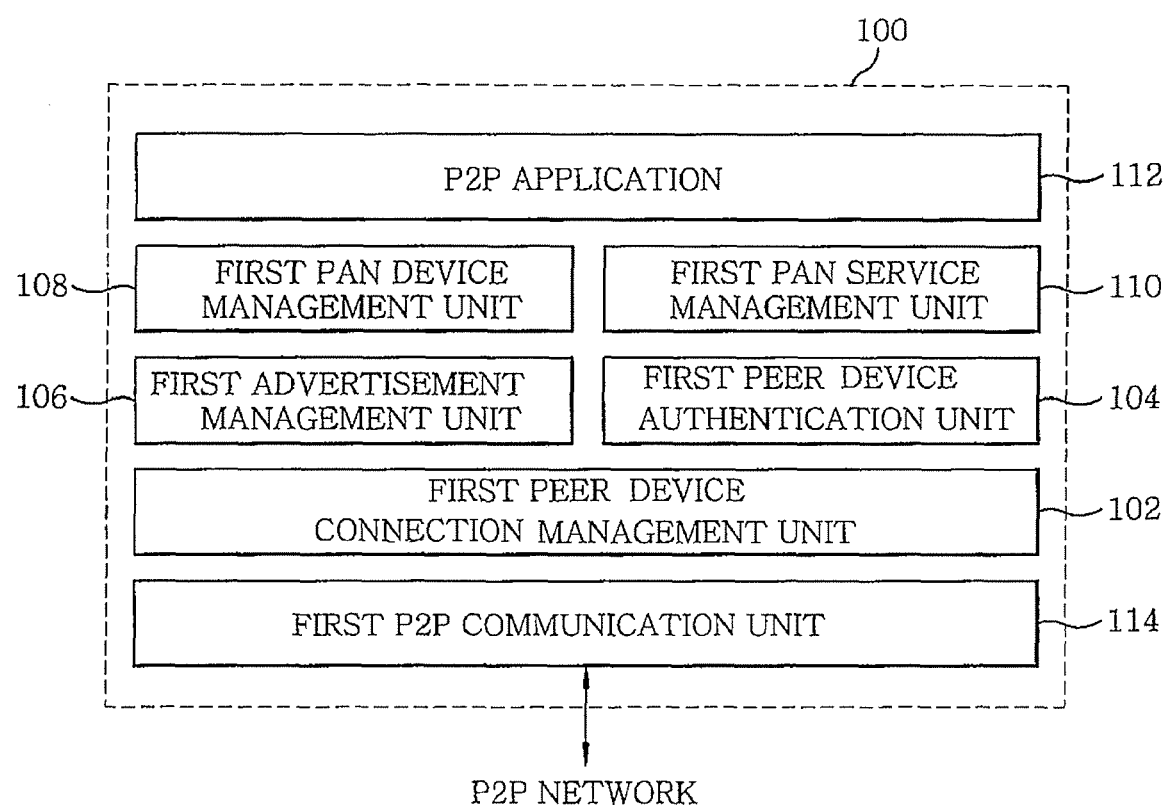
FIG. 2 is a block diagram showing the edge peer device of the super peer-based P2P network system shown in FIG. 1.

FIG. 2 is a block diagram showing the edge peer device of the super peer-based P2P network system shown in FIG. 1. The edge peer device 100 includes a first peer device connection management unit 102, a first peer device authentication unit 104, a first advertisement management unit 106, a first PAN device management unit 108, a first PAN service management unit 110, a P2P application 112, and a first P2P communication unit 114.

The first peer device connection management unit 102 functions to allow the edge peer device 100 to participate in a P2P network and establish a connection to other peer devices or the PAN gateway device 200. The first peer device connection management unit 102 is connected to the authentication server 400 through a super peer device 300a, to which the edge peer device 100 is initially designated to be connected, in association with the first peer device authentication unit 104 so that the edge peer device 100 can participate in the P2P network. Thus, the edge peer device is authenticated and then connected to the P2P network.

Further, when a connection to the initially designated super peer device 300a has failed due to the failure of the super peer device 300a, the first peer device connection management unit 102 attempts again to connect to other super peer device 300b, and thus establishes a connection to the P2P network. After a connection to the P2P network has been established, the first peer device connection management unit 102 searches for other edge peer device or the PAN gateway device 200, and establishes a pipe connection to the other edge peer device or the PAN gateway device 200 to transmit or receive content.

Next, the first peer device authentication unit 104 performs the initial authentication of the edge peer device 100 through the super peer devices 300a and 300b and the authentication server 400. Accordingly, when authentication has been completed by the authentication server 400, the edge peer device 100 is permitted to be connected to the P2P network through the super peer devices 300a and 300b.

Meanwhile, the first advertisement management unit 106 generates and stores advertisements, notifying the P2P network of edge peer information, to allow the edge peer device 100 to be searched for in the P2P network, indexes the generated advertisements and transmits the indexed advertisements to a relevant super peer device 300a connected thereto. Accordingly, the super peer device 300a also propagates the indexed advertisements to other super peer device 300b, thus enabling a subsequent search to be easily performed.

Further, after the PAN gateway device 200 is searched for through any one of super peer devices 300a and 300b, the first PAN device management unit 108 functions to request and receive a list of PAN devices permitted to be used thereby for example, a list of Bluetooth devices and the like from the PAN gateway device 200, manage the PAN device list, and provide the PAN device list to the P2P application 112 when a request for the PAN device list is received from the P2P application 112.

Further, the first PAN service management unit 110 functions to manage services included in the PAN device list received through the PAN gateway device 200, and provide a list of PAN services to the P2P application 112 when a request for the list of PAN services is received from the P2P application 112.

Here, the P2P application 112 refers to P2P applications that can be executed through the P2P network, the PAN gateway device 200, the list of PAN devices connected to the PAN gateway device 200, and services thereof. Further, the first P2P communication unit 114 performs P2P communication with the super peer devices 300a and 300b and other peer devices (not shown).

Next, the PAN gateway device 200 which transmits advertisements notifying the P2P network of its own ID and resource information, generates a search request message required for searching, and sends the search request message to other peer device or PAN gateway device in the above-described interconnection system will be described in detail.

Figure 3:
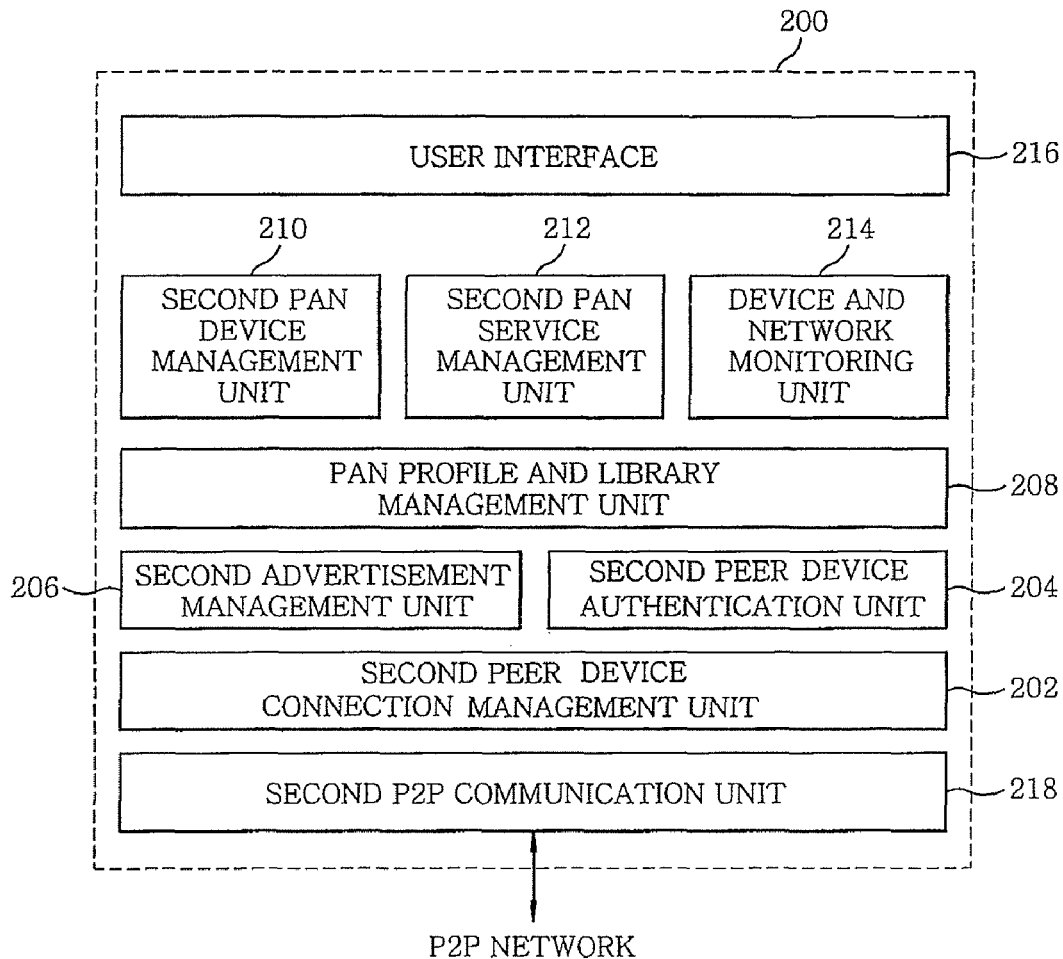
FIG. 3 is a block diagram showing the PAN gateway device of the super peer-based P2P network system shown in FIG. 1.

FIG. 3 is a block diagram showing the PAN gateway device of the super peer-based P2P network system shown in FIG. 1. The PAN gateway device 200 includes a second peer device connection management unit 202, a second peer device authentication unit 204, a second advertisement management unit 206, a PAN profile and library management unit 208, a second PAN device management unit 210, a second PAN service management unit 212, a device and network monitoring unit 214, a user interface 216 and a second P2P communication unit 218.

The second peer device connection management unit 202 is a part for allowing the PAN gateway device 200 to participate in the P2P network and establish a connection to other peers. That is, the second peer device connection management unit 202 allows the PAN gateway device 200 to be authenticated by the authentication server 400 through a super peer device 300b, to which the PAN gateway device 200 is initially designated to be connected, in association with the second peer device authentication unit 204 to participate in the P2P network, and thus the PAN gateway device 200 is connected to the P2P network. When a connection to the initially designated super peer device 300b has failed due to the failure of the super peer device 300b, the second peer device connection management unit 202 attempts again to connect to the other super peer device 300a, and thus the PAN gateway device 200 is connected to the P2P network.

Further, after the PAN gateway device 200 has been connected to the P2P network, the second peer device connection management unit 202 searches for the edge peer device 100 or other PAN gateway device, and establishes a pipe connection to the edge peer device 100 or the other PAN gateway device to transmit or receive contents.

Next, the second peer device authentication unit 204 performs the initial authentication of the PAN gateway device 200 through the super peer devices 300a and 300b and the authentication server 400. After authentication has been completed by the authentication server 400, the connection of the PAN gateway device 200 to the P2P network is permitted through the super peer devices 300a and 300b.

Further, the second advertisement management unit 206 generates and stores advertisements, notifying the P2P network of PAN gateway information in order for the PAN gateway device 200 to be searched for in the P2P network, indexes the generated advertisements, and transmits the indexed advertisements to the relevant super peer device 300b connected thereto. Accordingly, the super peer device 300b propagates the indexed advertisements to the other super peer device 300a.

Further, the PAN profile and library management unit 208 functions to allow the PAN gateway device 200 to search for surrounding PAN devices 500a, 500b, 500c and 500d and to pair a relevant PAN device and the edge peer device 100.

Further, the second PAN device management unit 210 manages a list of PAN devices 500a, 500b, 500c and 500d found by the PAN profile and library management unit 208, generates Universal Unique Identifiers (hereinafter referred to as 'UUIDs'), sets authorities to use the PAN devices for each edge peer device 100 found in the P2P network, maps the edge peer device 100 to the PAN devices, and manages information about the status of interconnection between the respective PAN devices 500a, 500b, 500c and 500d and the edge peer device 100.

The second PAN service management unit 212 manages services included in the found PAN devices 500a, 500b, 500c and 500d, and generates and manages UUIDs for the respective services.

Meanwhile, the device and network monitoring unit 214 manages status and history, indicating edge peer devices to which the respective PAN devices 500a, 500b, 500c and 500d are connected, and manages and monitors the strength of communication between the PAN gateway device 200 itself and the PAN devices 500a, 500b, 500c and 500d.

Further, the user interface 216 refers to an interface for providing various types of functions of the PAN gateway device 200 to the user.

Further, the second P2P communication unit 218 functions to perform P2P communication with the super peer devices 300a and 300b and other peer devices.

Next, the super peer device for performing indexing required for the propagation of a search request message transmitted from an edge peer device or a PAN gateway device or required for searching, and distributing indices among super peer devices in the above-described interconnection system will be described below.

Figure 4:
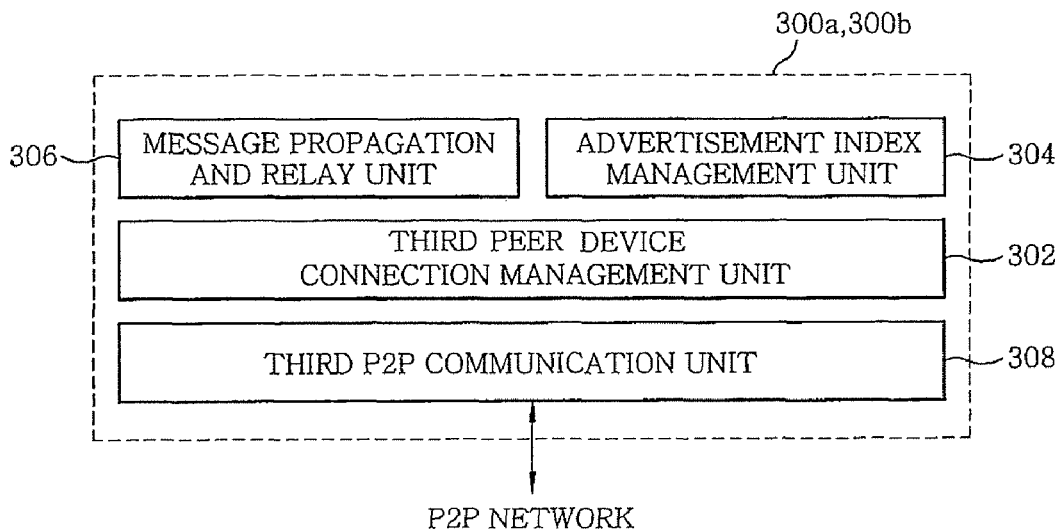
FIG. 4 is a block diagram showing the super peer device shown in FIG. 1.

FIG. 4 is a block diagram illustrating the super peer device shown in FIG. 1. Each of super peer devices 300a and 300b includes a third peer device connection management unit 302, an advertisement index management unit 304, a message propagation and relay unit 306, and a third P2P communication unit 308.

As shown in FIG. 4, when the PAN gateway device 200 or the edge peer device 100 requests each of the super peer devices 300a and 300b to participate in a P2P network, the third peer device connection management unit 302 requests authentication from the authentication server 400, and transmits the results of authentication to the PAN gateway device 200 or the edge peer device 100.

Further, when the PAN gateway device 200 or the edge peer device 100 transmits the indices of advertisements generated thereby to the super peer device 300a or 300b connected thereto, the advertisement index management unit 304 stores the indices in the super peer device 300a or 300b, and propagates the indices to other super peer device, thus aiding in searching for the edge peer device 100 or the PAN gateway device 200 and the content thereof.

The message propagation and relay unit 306 functions to allow the PAN gateway device 200 or the edge peer device 100 to propagate messages to other peer device or other gateway device. Further, the message propagation and relay unit 306 functions to search the indices of the super peer device 300a or 300b for a peer device or resource information when the PAN gateway device 200 or the edge peer device 100 transmits a query to the super peer device 300a or 300b at the time of searching for a specific peer device or specific contents. If the peer device or resource information is found, the message propagation and relay unit 306 transfers the query to a search target peer device, so that the search target peer device transmits its advertisement to the peer device which initially transmitted the search query. If neither peer device nor resource information is found, the message propagation and relay unit 306 transfers the query to other super peer device.

Meanwhile, the third P2P communication unit 308 performs P2P communication with other super peer devices and other peer devices.

Hereinafter, a process for mutually searching for an edge peer device and a PAN gateway device, selecting a device to be shared with the edge peer device from among PAN devices found by the PAN gateway device, and setting authority to use the selected device in the interconnection system based on the above-described super peer-based P2P network system will be described below.

Figure 5B:
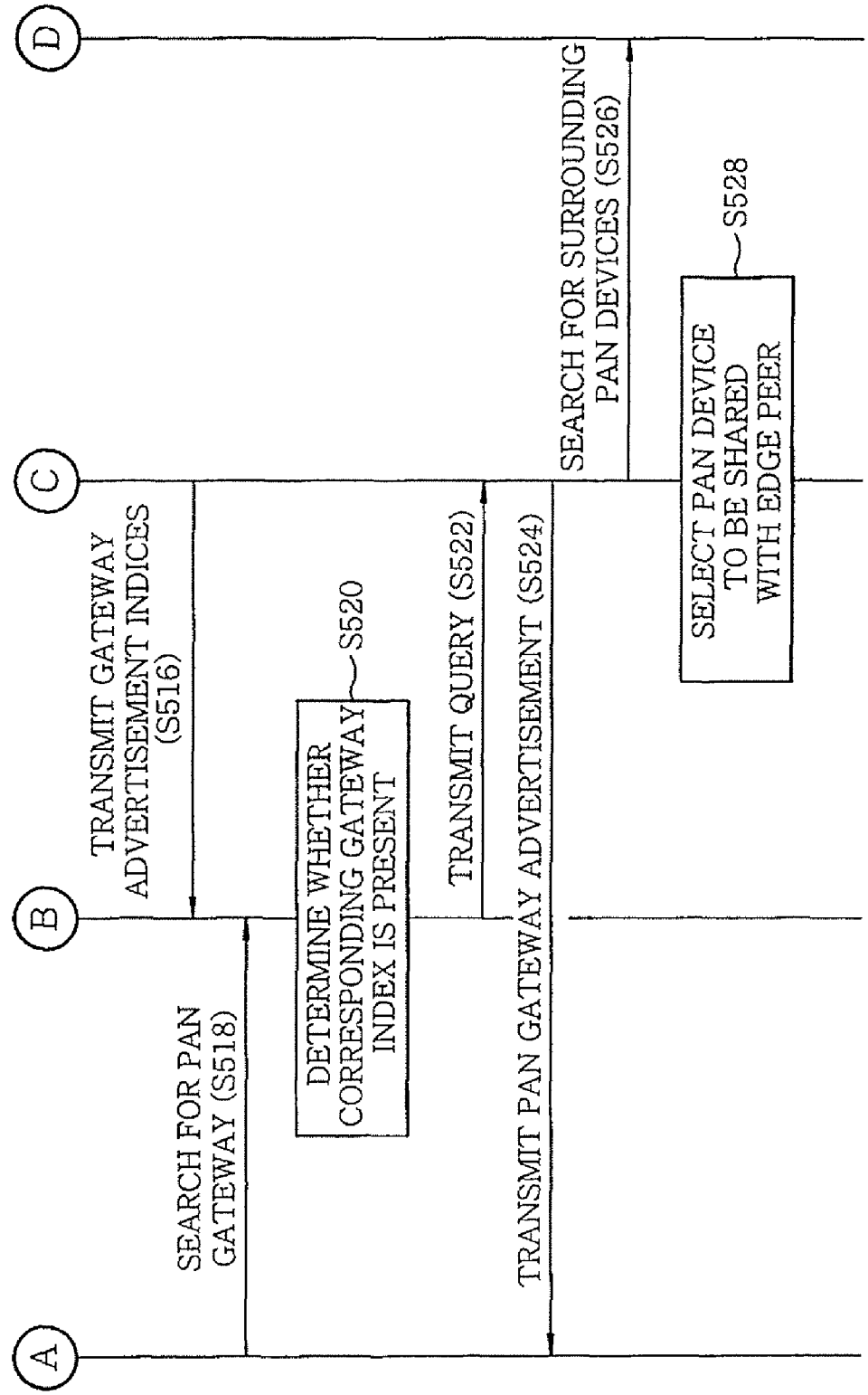

FIG. 5 is a flowchart showing a process for selecting a PAN device and setting authority to use the selected PAN device in accordance with the embodiment of the present invention.

Referring to FIG. 5, the edge peer device 100 and the PAN gateway device 200 access the authentication server 400 through the super peer devices 300a and 300b, which performs authentication of the edge peer device 100 and the PAN gateway device 200, and are permitted to participate in a P2P network after the authentication has been completed.

Further, the edge peer device 100 permitted to participate in the P2P network generates edge peer advertisements including its own device information, and stores the edge peer advertisements at step S502.

Next, the edge peer device 100 transmits advertisement indices corresponding to the generated edge peer advertisements to the super peer device 300a connected to the edge peer device 100 at step S504.

Meanwhile, the super peer device 300a, having received the advertisement indices from the edge peer device 100, manages the advertisement indices. That is, when the PAN gateway device 200 transmits a query for a search for the edge peer device 100 to the super peer device 300b connected thereto at step S506, the super peer device 300b determines whether an advertisement index corresponding to the edge peer device 100 is present in the super peer device 300b at step S508.

If it is determined that the advertisement index is not present in the super peer device 300b, the super peer device 300b transfers the query to other super peer device 300a. The super peer device 300a determines whether the advertisement index corresponding to the edge peer device 100 is present in the super peer device 300a, and transmits the query to the edge peer device 100 if it is determined that the advertisement index is present at step S510.

Accordingly, the edge peer device 100 transmits its edge peer advertisement to the PAN gateway device 200 in response to the received query, and thus notifies the PAN gateway device of its own information at step S512.

Similarly to the above method, the PAN gateway device 200 generates and stores PAN gateway advertisements including its own information at step S514. The PAN gateway device 200 transmits advertisement indices corresponding to the PAN gateway advertisements to the super peer device 300b connected thereto at step S516.

Further, the super peer device 300b manages the advertisement indices. That is, when the edge peer device 100 transmits a query for a search for the PAN gateway device 200 to the super peer device 300a connected thereto at step S518, the super peer device 300a determines whether an advertisement index corresponding to the PAN gateway device 200 is present in the super peer device 300a at step S520.

If it is determined that the advertisement index is not present in the super peer device 300a, the super peer device 300a transfers the query to other super peer device 300b. The super peer device 300b determines whether the advertisement index corresponding to the PAN gateway device 200 is present in the super peer device 300b, and transmits the query to the PAN gateway device 200 if it is determined that the advertisement index is present at step S522.

Accordingly, the PAN gateway device 200 transmits its own PAN gateway advertisement to the edge peer device 100 in response to the received query, and thus notifies the edge peer device 100 of its own information at step S524. Meanwhile, in the above-described embodiment of the present invention, the process of steps 502 to 524 is described to be sequentially performed step by step. However, it is apparent that, regardless of this sequence, edge peer devices and PAN gateway devices can be mutually searched for by using respective advertisement indices, so that the information of peer devices enabling P2P communication can be mutually acquired in the P2P network, and thus P2P communication can be performed.

Meanwhile, after peer devices are mutually searched for to perform P2P communication, the PAN gateway device 200 searches for surrounding PAN devices 500a, 500b, 500c and 500d at step S526, selects a specific PAN device to be shared with the edge peer device 100 from among the found PAN devices 500a, 500b, 500c and 500d, and sets the authority of the edge peer device 100 to use the specific PAN device at step S528. In this case, when there are peer devices found for P2P, the PAN gateway device 200 may select specific PAN devices for respective peer devices and set authorities to use the respective PAN devices.

Therefore, in the interconnection system based on the super peer-based P2P network system, the edge peer device and the PAN gateway device are mutually searched for, a PAN device to be shared with the edge peer device is efficiently selected from among the PAN devices found by the PAN gateway device, and authority to use the selected PAN device can be set.

Hereinafter, as described above, a process for allowing an edge peer device and a PAN device permitted to be used thereby to be interconnected by selecting a found PAN device and setting authority to use the PAN device in the interconnection system based on the super peer-based P2P network system will be described in detail.

FIG. 6 is a flowchart showing a process for interconnection between an edge peer device and a PAN device in accordance with the embodiment of the present invention.

Referring to FIG. 6, the edge peer device 100 searches surrounding PAN devices 500a, 500b, 500c and 500d for available PAN devices and services corresponding to the respective PAN devices at step S602. The edge peer device 100 transmits a query, which requests the information of the surrounding PAN devices 500a, 500b, 500c and 500d and services thereof, to the PAN gateway device 200 at step S604.

The PAN gateway device 200 transmits the information of the surrounding PAN devices 500a, 500b, 500c and 500d permitted to be used by the edge peer device 100 to the edge peer device 100 at step S606.

Next, the P2P application 112 of the edge peer device 100 selects a specific PAN device to be used from among the found surrounding PAN devices 500a, 500b, 500c and 500d at step S608, and sends an interconnection request message to the PAN gateway device 200 when a page corresponding to the selected PAN device is activated at step S610.

Further, when the interconnection request message is received, the PAN gateway device 200 determines whether the specific PAN device selected by the edge peer device 100 has already been interconnected with other peer at step S612.

If it is determined at step S612 that the selected specific PAN device is not interconnected with the other peer device, the PAN gateway device 200 pairs and interconnects the edge peer device 100, which requested interconnection, and the selected specific PAN device with each other according to the profile of the PAN device at step S614.

Next, when the interconnection between the edge peer device 100 and the selected specific PAN device has been completed, the PAN gateway device 200 sends an interconnection completion message to the edge peer device 100 at step S616.

Therefore, the interconnection system based on the super peer-based P2P network system selects the found PAN device and pairing the PAN device and the edge peer device according to the profile of the PAN device, thus enabling the edge peer device and the PAN device permitted to be used thereby to be effectively interconnected.

Hereinafter, a process, in which an edge peer device controls a PAN device and exchanges contents with the PAN device after the edge peer device and the PAN device have been interconnected, in the interconnection system based on the super peer-based P2P network system will be described in detail.

Figure 7A:
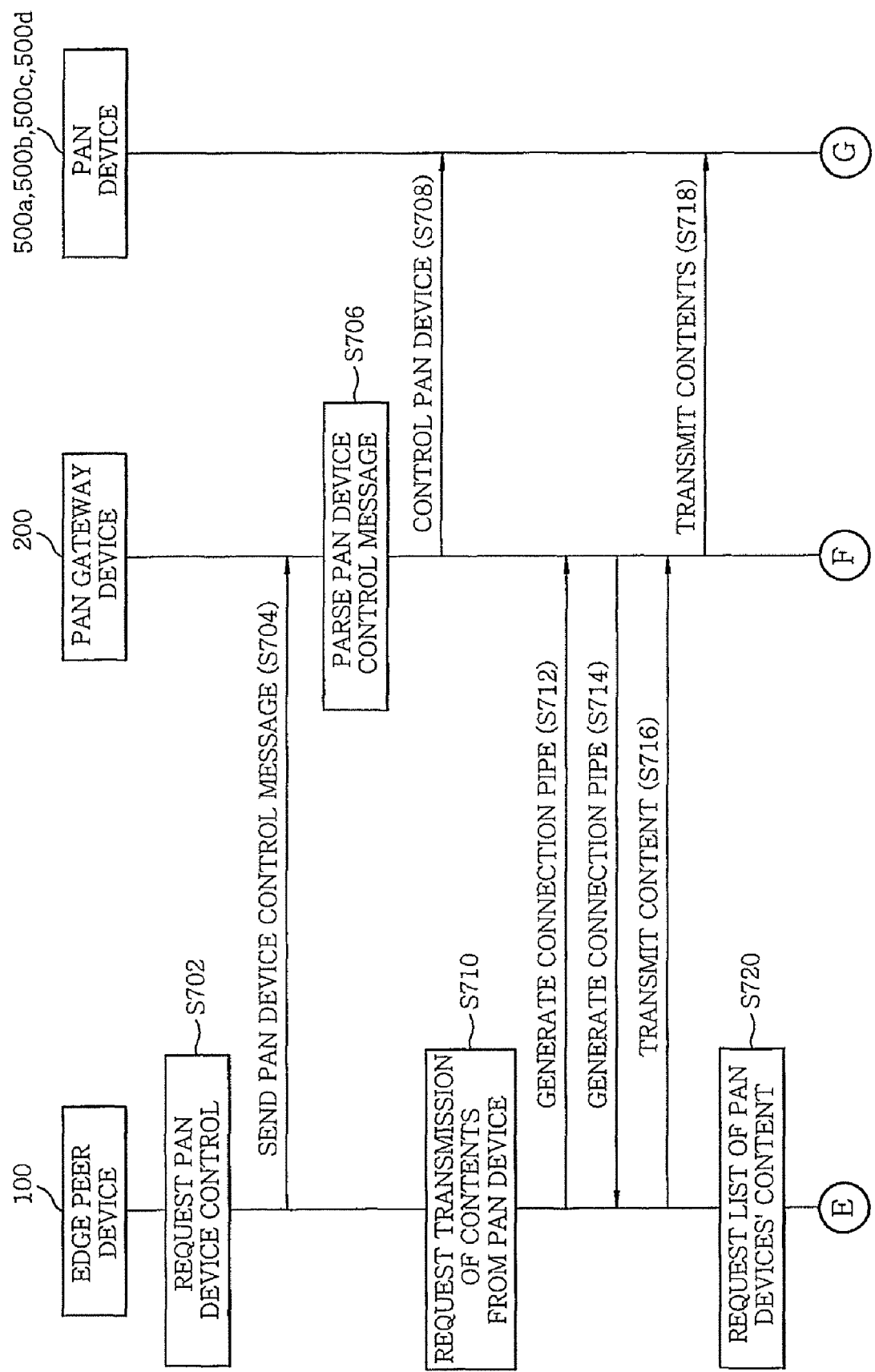

FIGS. 7A and 7B are flowcharts showing a process for controlling a PAN device and exchanging contents through the interconnection between an edge peer device and the PAN device in accordance with the embodiment of the present invention.

Referring to FIGS. 7A and 7B, when the edge peer device 100 requests the control of a specific PAN device having a control service at step S702, the edge peer device 100 generates a PAN device control message and sends the PAN device control message to the PAN gateway device 200 at step S704.

Further, when the PAN device control message is received from the edge peer device 100, the PAN gateway device 200 parses the PAN device control message at step S706, and controls a specific PAN device, with which a library suitable for a relevant PAN profile is associated, from among the PAN devices 500a, 500b, 500c and 500d in response to the parsed PAN device control message at step S708.

Meanwhile, when the edge peer device 100 requests the transmission of contents from the specific PAN device at step S710, a connection pipe is mutually generated between the edge peer device 100 and the PAN gateway device 200 at steps S712 and S714.

Through such a connection pipe, the edge peer device 100 transmits desired contents to the PAN gateway device 200 at step S716. The PAN gateway device 200 transmits the received contents to the specific one of the PAN devices 500a, 500b, 500c and 500d according to the profile of the PAN device at step S718.

Meanwhile, when the edge peer device 100 requests a list of content to be downloaded from the specific one of the PAN devices 500a, 500b, 500c and 500d at step 720, the edge peer device 100 sends a contents list request message, requesting a content list, to the PAN gateway device 200 at step S722.

Further, the PAN gateway device 200 requests the contents list from the specific one of the PAN devices 500a, 500b, 500c and 500d at step S724, receives the requested contents list and generates a content list response message corresponding to the requested content list at step 726, and transmits the contents list to the edge peer device 100 at step S728.

Next, when the edge peer device 100 selects contents to be downloaded from the received content list at step S730, the edge peer device 100 generates and sends a contents download request message corresponding to the selected contents at step S732.

Accordingly, the PAN gateway device 200 requests relevant contents from the specific one of the PAN devices 500a, 500b, 500c and 500d at step S734. After the requested content has been received, a connection pipe is mutually generated between the PAN gateway device 200 and the edge peer device 100 at steps S736 and S738. The PAN gateway device 200 transmits the relevant contents, received through the connection pipe, to the edge peer device 100 at step 740.

Meanwhile, when the page of the specific PAN device selected in the application program of the edge peer device 100 is deactivated, and the use of the page is terminated, the edge peer device 100 sends an interconnection release request message to the PAN gateway device 200 at step S742. The PAN gateway device 200 releases the pairing of the edge peer device 100 and the specific PAN device at step S744. When the release of the pairing has been completed, the PAN gateway device 200 sends an interconnection release completion message between the edge peer device 100 and the specific PAN device to the edge peer device 100 at step S746.

Therefore, the interconnection system based on the super peer-based P2P network system interconnects an edge peer device and a PAN device selected by the edge peer device with each other, thus effectively controlling the PAN device interconnected with the edge peer device and enabling selected contents to be effectively exchanged between the edge peer device and the PAN device.

While the invention has been shown and described with respect to the embodiments, it will be understood by those skilled in the art that various changes and modifications may be made without departing from the scope of the invention as defined in the following claims.

What is claimed is:

1. An edge peer device, comprising:
   a first peer device connection management unit for allowing the edge peer device to participate in a Peer-to-Peer (P2P) network through a connection to a super peer device or a Personal Area Network (PAN) gateway device, and establishing a pipe connection to other edge peer device or the PAN gateway device to transmit or receive contents;
   a first peer device authentication unit for performing authentication of the edge peer device through the super peer device and an authentication server;
   a first advertisement management unit for generating and storing advertisements which notifies the P2P network of edge peer information and indexing the generated advertisements to transmit the indexed advertisements to the super peer device;
   a first PAN device management unit for requesting and receiving a list of PAN devices from the PAN gateway device to manage the PAN device list after the PAN gateway device has been found;
   a first PAN service management unit for managing and providing services included in the PAN device list; and
   a first P2P communication unit for performing P2P communication with the super peer device and other peer devices.

2. A Personal Area Network (PAN) gateway device, comprising:
   a second peer device connection management unit for allowing the PAN gateway device to participate in a P2P network through a connection to a super peer device or an edge peer device, and establishing a pipe connection to the edge peer device or other PAN gateway device to transmit or receive contents;

a second peer device authentication unit for performing authentication of the PAN gateway device through both the super peer device and an authentication server;

a second advertisement management unit for generating and storing advertisements which notify the P2P network of PAN gateway information and indexing the advertisements to transmit the indexed advertisements to the super peer device;

a PAN profile and library management unit for searching for surrounding PAN devices and pairing the edge peer device and the found PAN devices;

a second PAN device management unit for managing a list of the found PAN devices to generate Universal Unique Identifiers (UUIDs) corresponding to the PAN devices;

a second PAN service management unit for managing services of the found PAN devices to generate and manage UUIDs corresponding to the respective services;

a device and network monitoring unit for managing status and history of connection to the PAN devices to manage and monitor strength of communication with the PAN devices; and a second P2P communication unit for performing P2P communication with the super peer device and other peer devices.

3. The PAN gateway device of claim 2, wherein the second PAN device management unit sets authority of the edge peer device to use the PAN devices and maps the edge peer device to the PAN devices.

4. The PAN gateway device of claim 3, wherein the second PAN device management unit manages information about status of interconnection between the PAN devices and the edge peer device.

5. A super peer device, comprising:
a third peer device connection management unit for requesting authentication from an authentication server when a request for participation in a Peer-to-Peer (P2P) network is received from at least one of a Personal Area Network (PAN) gateway device and an edge peer device to transmit results of authentication to the at least one of PAN gateway device and the edge peer device;

an advertisement index management unit for storing indices of advertisements received from the at least one of PAN gateway device and the edge peer device to propagate the indices to other super peer device;

a message propagation and relay unit for propagating a message received from the at least one of PAN gateway device and the edge peer device to other peer or other gateway to search for a specific peer device or resource information when a query for a search for the specific peer device or content is received from the at least one of PAN gateway device and the edge peer device; and a third P2P communication unit for performing P2P communication with the PAN gateway device, the edge peer device and other super peer device, and the edge peer device further comprising:
a first peer device connection management unit for allowing the edge peer device to participate in a Peer-to-Peer (P2P) network through a connection to a super peer device or a Personal Area Network (PAN) gateway device, and establishing a pipe connection to other edge peer device or the PAN gateway device to transmit or receive contents;

a first peer device authentication unit for performing authentication of the edge peer device through the super peer device and an authentication server;

a first advertisement management unit for generating and storing advertisements which notifies the P2P network of edge peer information and indexing the generated advertisements to transmit the indexed advertisements to the super peer device;

a first PAN device management unit for requesting and receiving a list of PAN devices from the PAN gateway device to manage the PAN device list after the PAN gateway device has been found;

a first PAN service management unit for managing and providing services included in the PAN device list; and a first P2P communication unit for performing P2P communication with the super peer device and other peer devices.

6. The super peer device of claim 5, wherein the message propagation and relay unit transmits the received query to a search target peer device to allow the search target peer device to transmit its own advertisements to the at least one of PAN gateway device and the edge peer device when the peer device or resource information is found.

7. The super peer device of claim 6, wherein the message propagation and relay unit transfers the received query to the other super peer device when the peer device or resource information is not found.

8. A Peer-to-Peer (P2P) network-based interconnection method, comprising:
authenticating both an edge peer device and a Personal Area Network (PAN) gateway device to allow the edge peer device and the PAN gateway device to participate in a P2P network;

receiving advertisement indices corresponding to edge peer advertisements or PAN gateway advertisements generated by the edge peer device or the PAN gateway device, respectively manage the advertisement indices;

determining whether an advertisement index corresponding to a search target edge peer device or a search target PAN gateway device is present, when a search query is received from the PAN gateway device or the edge peer device;

transferring the search query to the search target edge peer device or the search target PAN gateway device through a super peer device, if it is determined that the advertisement index is present; and transmitting an edge peer advertisement or a PAN gateway advertisement to the PAN gateway device or the edge peer device, which requested the search, in response to the received search query.

9. The P2P network-based interconnection method of claim 8, further comprising transferring the search query to other super peer device if it is determined that the advertisement index is not present.

10. A Peer-to-Peer (P2P) network-based interconnection method, comprising:
receiving a query, which requests provision of information of surrounding PAN devices and services, from an edge peer device in a personal area network (PAN) gateway device;

transmitting information of surrounding PAN devices, permitted to be used by the edge peer device, to the edge peer device;

receiving an interconnection request message for requesting interconnection with a specific PAN device selected to be used from among the surrounding PAN devices;

determining whether the selected specific PAN device has already been interconnected with other peer device in response to the received interconnection request message; and pairing and interconnecting the edge peer device and the specific PAN device according to a profile of the PAN device, if it is determined that the selected specific PAN device has not already been interconnected with other peer device, and wherein the edge peer device is configured to comprise:

a first peer device connection management unit for allowing the edge peer device to participate in a Peer-to-Peer (P2P) network through a connection to a super peer device or a Personal Area Network (PAN) gateway device, and establishing a pipe connection to other edge peer device or the PAN gateway device to transmit or receive contents;

a first peer device authentication unit for performing authentication of the edge peer device through the super peer device and an authentication server;

a first advertisement management unit for generating and storing advertisements which notifies the P2P network of edge peer information and indexing the generated advertisements to transmit the indexed advertisements to the super peer device;

a first PAN device management unit for requesting and receiving a list of PAN devices from the PAN gateway device to manage the PAN device list after the PAN gateway device has been found;

a first PAN service management unit for managing and providing services included in the PAN device list; and a first P2P communication unit for performing P2P communication with the super peer device and other peer devices.

11. The P2P network-based interconnection method of claim 10, wherein the step of transmitting information to the edge peer device comprises:

searching for advertisements received from the edge peer device, mutually acquiring peer information to search for surrounding PAN devices;

selecting a PAN device to be interconnected with the edge peer device from among the found surrounding PAN devices; and setting authority of the edge peer device to use the selected PAN device.

12. The P2P network-based interconnection method of claim 10, further comprising, after said pairing and interconnecting, the PAN gateway device sending an interconnection completion message to the edge peer device.

13. The P2P network-based interconnection method of claim 10, further comprising, after said pairing and interconnecting:

receiving a control message from the edge peer device in the PAN gateway device; and parsing the received control message to control the specific PAN device interconnected with the edge peer device in response to the control message.

14. The P2P network-based interconnection method of claim 10, further comprising, after said pairing and interconnecting:

generating a connection pipe between the edge peer device and the PAN gateway device, when a request for content transmission is received from the edge peer device;

receiving content from the edge peer device through the generated connection pipe; and transmitting the received content to the specific PAN device.

15. The P2P network-based interconnection method of claim 10, further comprising, after said pairing and interconnecting:

generating a content list response message for the specific PAN device, when a request for a list of content is received from the edge peer device;

transmitting the content list response message to the edge peer device;

requesting and receiving the content from the specific PAN device, when a content download request message corresponding to the selected content is received from the edge peer device;

generating a connection pipe between the edge peer device and the PAN gateway device, when the content is received; and transmitting the received content to the edge peer device through the generated connection pipe.

16. The P2P network-based interconnection method of claim 15, further comprising, after said transmitting the received content to the edge peer device:

releasing the pairing of the edge peer device and the specific PAN device, when use of the specific PAN device is terminated and an interconnection release request message is received from the edge peer device; and sending an interconnection release completion message to the edge peer device, when the release of the pairing is completed.

17. A Peer-to-Peer (P2P) network-based interconnection method, comprising:

transmitting a query, which requests surrounding Personal Area Network (PAN) devices and service information to a PAN gateway device in an edge peer device;

receiving information of surrounding PAN devices permitted to be used by the edge peer device from the PAN gateway device;

requesting interconnection with a specific PAN device selected from the received surrounding PAN device information; and pairing and interconnecting the specific PAN device and the edge peer device according to a profile of the PAN device, and wherein the edge peer device is configured to comprise:

a first peer device connection management unit for allowing the edge peer device to participate in a Peer-to-Peer (P2P) network through a connection to a super peer device or a Personal Area Network (PAN) gateway device, and establishing a pipe connection to other edge peer device or the PAN gateway device to transmit or receive contents;

a first peer device authentication unit for performing authentication of the edge peer device through the super peer device and an authentication server;

a first advertisement management unit for generating and storing advertisements which notifies the P2P network of edge peer information and indexing the generated advertisements to transmit the indexed advertisements to the super peer device;

a first PAN device management unit for requesting and receiving a list of PAN devices from the PAN gateway device to manage the PAN device list after the PAN gateway device has been found;

a first PAN service management unit for managing and providing services included in the PAN device list; and a first P2P communication unit for performing P2P communication with the super peer device and other peer devices.

18. The P2P network-based interconnection method of claim 17, further comprising, after said pairing and interconnecting the specific PAN device and the edge peer device:
generating a connection pipe between the edge peer device and the PAN gateway device, when contents is transmitted to the specific PAN device; and
transmitting the contents to the PAN gateway device through the connection pipe so that the content is transmitted to the specific PAN device.

* * * * *